Nov. 4, 1941.                G. EATON                2,261,238

ELECTRIC PLUG

Filed May 9, 1938

INVENTOR
George Eaton.
BY
Milburn & Milburn ATTORNEYS.

Patented Nov. 4, 1941

2,261,238

UNITED STATES PATENT OFFICE 2,261,238

ELECTRIC PLUG

George Eaton, Cleveland, Ohio

Application May 9, 1938, Serial No. 206,822

4 Claims. (Cl. 173—332)

This invention relates to a connecter plug for electrical appliances and is an improvement upon that disclosed in my co-pending application Serial No. 56,258, filed December 26, 1935, as well as upon my prior Patent No. 1,905,452, April 25, 1933.

As explained in the aforesaid patent and pending application, the attachment of an ordinary electric plug to the terminals of an electric toaster or the like, and the removal of the same therefrom, has proved very troublesome because it is necessary to hold the appliance with the one hand while applying or removing the plug with the other hand. This is especially objectionable in removing the plug when the appliance is in a highly heated condition. As in the aforesaid patent and patent application, the present invention contemplates an improved form of electric plug in which there is provided means that can be readily manipulated for opening the electric connecting means of the plug so as to permit the same to be readily attached to or detached from the electric terminals of the appliance without applying the other hand of the user.

In the present application, the object of the invention is to devise an improvement in the construction of the electric connecting clips that are adapted to be opened for applying and removing the same to and from the electric terminals of the appliance.

Another object is to devise an improved form of clip that is especially well adapted for use in combination with the particular type of plug now under consideration, especially as to the means for opening the clip members.

A further object is to provide an improved manner of assembly of the clip members within the plug casing, with particular reference to the opening operation of the clip members.

Other objects will appear from the following description and claims when considered together with the accompanying drawing.

Figure 1:
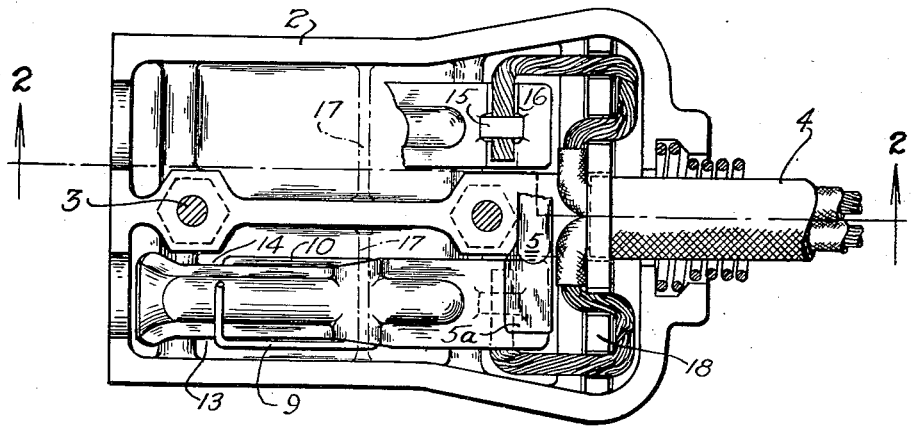
Fig. 1 is a view showing the interior of the plug and the manner of connecting the wires to the clip members.

It is to be understood that the present form of disclosure is merely for purposes of illustration and that there may be devised various modifications thereof without departing from the spirit of the invention as herein set forth and claimed.

The plug casing consists of two companion parts 1 and 2 of electric insulation material, these parts being connected together by means of the bolts 3. The two halves of the plug casing are properly molded with recesses to accommodate the clip members and has duplicate openings at the front end thereof for application of the plug clips to the terminals of the electric appliance, and a rear opening through which extends the electric cable 4. The clip members are of duplicate form and are adapted for manipulation by the same button 5 which extends through an opening in the one casing member 1 and has inner lateral extensions 5a for engagement of the two clip members, as will be explained.

Each clip member comprises the lower part 6 and the upper part 7, between which is arranged the coil 8 of a spring so as to serve as a pivotal bearing between the clip members which are so formed as to accommodate such an arrangement, as indicated in the drawing. There are portions 9 and 10 extending from the coil 8 angularly with respect to the edges of the clip members and terminating in the end portions 11 and 12 which extend across the forward portions of the clip members so as to normally force the same towards closed position. The sides of the clip members are cut away, as indicated at 13 and 14, in order to accommodate the portions 9 and 10 of the spring and to permit the employment of correspondingly fewer turns in the coil 8, thereby keeping down the over-all transverse dimension of the clip members. It will be observed that the clip members are of full width at the forward ends thereof so as to facilitate the entry of the terminals therebetween and that the cut-away portions 13 and 14 are gradually merged into the full-width portions at the forward and rearward ends thereof.

The rear end portions of the lower clip members are provided with sheared-out loops 15 and the companion oppositely disposed loop portions 16 for receiving the electric wires. That is, the wires are threaded through the loop 15, as indicated in Fig. 1, and are then secured in such connection by clamping the loop portions 15 and 16 so as to firmly engage the wire. It will be observed that the lower clip member, in each case, is of substantially straight form and that it lies in substantially still position in the bottom of the casing part 2, as will be explained.

The upper clip member, in each case, has its rear portion angularly disposed with respect to its forward portion; and the rearward portion thereof extends so as to over-lie fully the rear end portion of the companion lower clip member. The rear end portions of both upper clip members are engaged by the laterally extending arms of the presser button 5 for opening the clip members when it is desired to attach or remove the plug. My particular means for attaching the wires to the lower clip members permits the upper clip members to be extended farther to the rear than would otherwise be possible, and consequently the button 5 can be located farther towards the rear in the present form of plug. The result is that my present plug can be used with those electric devices in which guards are provided about the terminals without interfering with the manipulation of the presser button 5. Also, considerably greater leverage can be obtained for opening the clip members because of the extended length of the upper clip members rearwardly, thereby facilitating the operation thereof.

Both the upper and lower clip members, in each case, are provided with reinforcing ribs longitudinally thereof, these ribs in the forward portions serving to render more effective the engagement of the terminals, as the terminals are engaged in the grooves afforded thereby.

Figure 2:
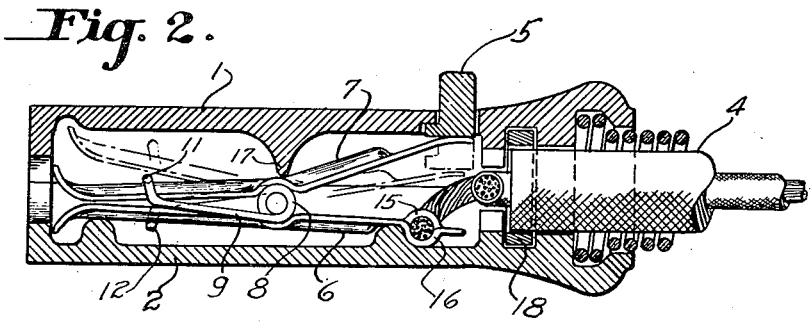
Fig. 2 is a view taken on line 2—2 of Fig. 1.
Figure 3:
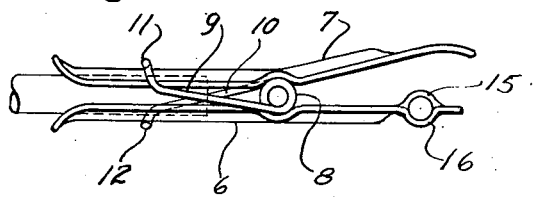
Fig. 3 is a side view of one of the clip members alone.

The inner surface of the upper casing member 1 is formed with integral ribs 17 which extend between the side walls and middle partition of this casing member, these ribs being adapted for engagement with the upper clip members slightly rearwardly of the axis of the spring coil 8 so as to hold the clips in fixed position within the casing except for the pivotal movement of the upper clip member about the coil 8, as indicated in Fig. 2, the lower clip members remaining stationary. As indicated, the ribs 17 are given tapered form so as to afford a comparatively reduced edge portion for operative engagement of the transversely curved portion of the upper clip members therewith. Theoretically the ribs 17 may engage just above the axis of the coil 8.

The cable 4 extends through the rear opening of the casing and also through the middle of the anchoring or strain-relieving means which is indicated in a general way by reference numeral 18. This strain-relieving means is in the form of a substantially rectangular member stamped out of sheet material of electric insulating material through which the stripped end portions of the wires are extended in a tortuous manner prior to attachment of the wires to the rear ends of the lower clip members, thereby relieving the points of wire connection from strain to which they would otherwise be subjected. The member 18 has its edges engaged in grooves in the inner surfaces of the casing members 1 and 2.

Not only can my improved plug be attached to or removed from an electric appliance by one hand, but such manipulation is greatly facilitated by the increased leverage which means less effort on the part of the user. Also, the location of the presser button at such an extremely rearward point, is a means of avoiding any interference by the guard which is often found upon electrical appliances. By means of the ribs 17, the clips are maintained in substantially stationary position within the casing except for the pivotal movement of the upper clip members about the coils 8, the upper clip members alone being actuated by the manipulation of the presser button 5. Although theoretically the ribs 17 might be located in the vertical axial plane through the coils 8, yet by locating them just rearwardly thereof there is precluded any danger of the engagement of these ribs forwardly of the plane just referred to. Thus there is always ensured proper relationship between these parts so as to ensure proper functioning of the clip members.

In assemblying the parts, the button 5 will be inserted into the opening in the upper casing member 1 from the inside thereof and the extensions or arms 5a will prevent the same from removal therefrom after the other parts are assembled, as will be understood.

The springs will be made of heat-resisting wire and the ends of the spring, in each instance, will extend across the terminal-engaging region of the clip members so as to produce most positive and dependable engagement of the clips with the terminals of the electric toaster or other appliance.

What I claim is:

1. An electric plug comprising a casing of electric insulating material, a terminal-receiving socket in said casing, said socket consisting of a pair of relatively pivoted members, spring means for normally forcing said members towards closed position, one of said members having its rear end portion provided with means for connecting an electric wire thereto, and the other of said members having a free rear-end lever portion, means extending through said casing so as to be operatable by the hand of the user for depressing said lever portion for opening said socket, and means for holding said one member in proper position during opening and closing movements of said other member 2. An electric plug comprising a casing of electric insulation material, a terminal-receiving socket in said casing, said socket comprising a pair of clip members having pivotal connection with each other about an intermediate transverse axis, the forward end portions of said members being of substantial length and being inclined forwardly towards each other, said members being provided with companion transverse depressed portions between the forward and rearward portions and corresponding with said pivotal axis, and a coil spring of heat-resisting wire arranged within said depressed portions and having intermediate arm portions extending from the ends of the coil and cross-wise of each other past the edges of the clip members and having the end portions thereof extending laterally in opposite directions across and in engagement with the outer surfaces of the forward end portions of said members and across the terminal-engaging zone thereof so as to normally force the same towards closed position for effective electric contact between the forward ends of the members and the terminals engaged thereby, one of said members having its rear end portion provided with unitary substantially flat means for connecting an electric wire thereto, and the other of said members having a free rear-end lever portion overhanging said wire-connecting means, whereby said lever portion may be operated in close proximity to said one member without interference by said wire-connecting means, and electric insulation means extending through said casing so as to be operatable by the hand of the user for depressing said lever portion for opening said socket.

3. An electric plug comprising a casing of electric insulating material, a terminal-receiving socket in said casing, said socket consisting of a pair of relatively pivoted members, spring means for normally forcing said members towards closed position, one of said members having its rear end portion provided with means for connecting an electric wire thereto, said casing having means for holding said one member in proper position during opening and closing movements of said other member, and the other of said members having a free-end lever portion, means extending through said casing so as to be operatable by the hand of the user for depressing said lever portion for opening said socket, and said casing having a projection engaged by said other pivoted member at a point at least as far rearwardly as the vertical plane through the pivotal axis of said members so as to effect pivotal movement of said other of said members alone during opening and closing of the socket.

4. An electric plug comprising a casing of electric insulating material, a terminal-receiving socket in said casing, said socket comprising a pair of clip members one of which has pivotal connection with respect to the other about an intermediate transverse axis, the forward end portions of said members being of substantial length and normally inclined forwardly towards each other, said members being provided with companion transverse depressed portions corresponding with said pivotal axis, a coil spring of heat-resisting wire arranged within said depressed portions and having arm portions extending from opposite ends of said coil and in directions cross-wise of each other past the edges of the clip members and having the end portions thereof extending laterally in opposite directions across and in engagement with the outer surfaces of the forward end portions of said members and across the terminal-engaging zone thereof so as to normally force the same towards closed position for effective electric contact between the forward ends of the members and the terminal engaged thereby, the rear end portion of one of said members being adapted for connecting an electric wire thereto, and the other of said members having a free rear-end lever portion, means extending through said casing so as to be operatable by the hand of the user for engaging said lever portion for opening said socket, and means for holding said one member in proper position during opening and closing movements of said other member.

GEORGE EATON.